United States Patent
Choi et al.

(10) Patent No.: US 8,853,328 B2
(45) Date of Patent: Oct. 7, 2014

(54) SHEET COMPOSITION AND SHEET PRODUCED FROM SAME

(75) Inventors: Sang-Deuk Choi, Ulsan (KR); Kyeung-Ho Kim, Ulsan (KR); Yong-Gu Kweon, Busan (KR); Kyo-Hoon Shin, Ulsan (KR)

(73) Assignee: LG Hausys, Ltd., Seoul (KR)

( * ) Notice: Subject to any disclaimer, the term of this patent is extended or adjusted under 35 U.S.C. 154(b) by 698 days.

(21) Appl. No.: 13/060,140

(22) PCT Filed: Aug. 31, 2009

(86) PCT No.: PCT/KR2009/004882
§ 371 (c)(1),
(2), (4) Date: Feb. 22, 2011

(87) PCT Pub. No.: WO2010/024640
PCT Pub. Date: Mar. 4, 2010

(65) Prior Publication Data
US 2011/0159254 A1    Jun. 30, 2011

(30) Foreign Application Priority Data
Aug. 29, 2008   (KR) .................. 10-2008-0085485

(51) Int. Cl.
*C08L 53/02* (2006.01)
*C08L 31/04* (2006.01)

(52) U.S. Cl.
CPC .............. *C08L 53/025* (2013.01); *C08L 53/02* (2013.01); *C08L 31/04* (2013.01)
USPC ............... 525/222; 525/93; 525/98; 525/314; 524/524; 428/195.1

(58) Field of Classification Search
CPC ........ C08L 53/025; C08L 53/02; C08L 31/04
USPC ..................... 525/222, 93, 98, 314; 524/524; 428/195.1
See application file for complete search history.

(56) References Cited

U.S. PATENT DOCUMENTS

| 3,424,649 A | 1/1969 | Nyberg |
| 4,203,815 A | 5/1980 | Noda et al. |
| 5,178,946 A * | 1/1993 | Sato et al. .................. 428/412 |

(Continued)

FOREIGN PATENT DOCUMENTS

| JP | 2001-253987 | 9/2001 |
| JP | 2002-273841 A | 9/2002 |

(Continued)

OTHER PUBLICATIONS

Shiomi et al. Macromolecules 1986, 19, 2274-2280.*

(Continued)

*Primary Examiner* — Mark Kaucher
(74) *Attorney, Agent, or Firm* — McKenna Long & Aldridge, LLP

(57) ABSTRACT

The present invention relates to a sheet composition containing at least one of either a polystyrene-based copolymer or an ethylene vinyl acetate-based copolymer, to a sheet produced from the same, to a laminated sheet containing the sheet, and to a composite sheet containing the laminated sheet. The sheet according to the present invention is provided with a high functional stability including wear resistance, oil resistance, and aging resistance, and superior embossing retention characteristics.

22 Claims, 1 Drawing Sheet

(56) References Cited

U.S. PATENT DOCUMENTS

| | | | |
|---|---|---|---|
| 5,198,496 A | 3/1993 | Alvarez et al. | |
| 5,250,349 A | 10/1993 | Nakagawa et al. | |
| 5,290,842 A * | 3/1994 | Sasaki et al. | 524/271 |
| 5,401,803 A * | 3/1995 | Rex | 525/170 |
| 2002/0177669 A1* | 11/2002 | Jenny et al. | 525/332.8 |
| 2006/0281852 A1 | 12/2006 | Inada | |
| 2007/0142621 A1* | 6/2007 | Reif et al. | 528/480 |
| 2007/0282052 A1* | 12/2007 | Bhowmick et al. | 524/500 |
| 2008/0171022 A1* | 7/2008 | Zech | 424/93.7 |

FOREIGN PATENT DOCUMENTS

| | | | |
|---|---|---|---|
| JP | 2002-317099 A | 10/2002 | |
| JP | 2002317099 A * | 10/2002 | C08L 55/02 |
| JP | 2003-340968 | 12/2003 | |
| JP | 2004-074489 | 3/2004 | |
| JP | 2004-075937 | 3/2004 | |
| JP | 2007-045928 | 2/2007 | |
| WO | 2004-101672 | 11/2004 | |

OTHER PUBLICATIONS

Machine Translation of JP 2002317099 A.*

Machine Translation of JP 2002-273841.*

Database WPI Week 200323 Thomson Scientific, London, GB; AN 2003-233588, XP002668657, 2003.

* cited by examiner

SHEET COMPOSITION AND SHEET PRODUCED FROM SAME

This application is a National Stage Entry of International Application No. PCT/KR2009/004882, filed Aug. 31, 2009, and claims the benefit of Korean Application No. 10-2008-000085485, filed on Aug. 29, 2008, which is hereby incorporated by reference for all purposes as if fully set forth herein.

TECHNICAL FIELD

The present invention relates to a sheet composition that can provide a functional stability having a high properties including wear resistance, oil resistance, and aging resistance, and superior embossing retention characteristics, to a sheet produced from the same, to a laminated sheet containing the sheet, and to a composite sheet containing the laminated sheet.

BACKGROUND ART

Leather that is generally called by us may be largely divided into natural leather and artificial leather. The natural leather is processed with an animal skin so that the output is limited, the cost is high, the continuous working is not possible, and also the diversification of color, the uniformization of the quality, and the like will not be possible. However, the artificial leather is the leather with the possible similar properties to the natural leather, in which the artificial leather uses a fiber material, such as a non-woven fabric or a fabric, as a basic fabric, and then puts an organic compound synthetic sheet on the above basic fabric, so that the artificial leather plays a role in making up for the problems of the natural leather as mentioned above.

Generally, polyvinyl chloride, polyolefin, and the like are mainly used for producing the artificial leather, and specifically the use of polyolefin is increased because the use of the material containing halogen is limited.

However, the sheet produced by using the polyvinyl chloride, the polyolefin, and the like has a poor wear resistance, poor oil resistance, poor flame retardancy, and the like, and also the surface on the embossing processing sheet on the produced sheet can be broken.

DISCLOSURE

Technical Problem

An object of the present invention is to provide a sheet composition that can provide a functional stability having a high properties including wear resistance, oil resistance, and aging resistance, and superior embossing retention characteristics, to a sheet produced from the same, to a laminated sheet containing the sheet, and to a composite sheet containing the laminated sheet.

Technical Solution

The present invention provides a sheet composition containing a polystyrene-based copolymer and an ethylene vinyl acetate-based copolymer, in which the content of the vinyl acetate in the ethylene vinyl acetate-based copolymer is more than 50 wt %.

In addition, the present invention provides a sheet produced from the sheet composition.

In addition, the present invention provides a sheet and a method for producing the same, in which the surface of the sheet is embossed.

In addition, the present invention provides a laminated sheet and a method for producing the same, in which a base sheet, a middle sheet, and the sheet produced from the sheet composition are laminated in serial order, and the sheet produced from the sheet composition is embossed.

In addition, the present invention provides a composite sheet that is produced by laminating a base material layer, a primer layer, the laminated sheet, a surface primer layer, and a surface coating layer in serial order.

Advantageous Effects

The sheet according to the present invention may have wear resistance by using at least one of polystyrene-based copolymer and ethylene vinyl acetate-based copolymer as a main material. Therefore, a painting process that is performed on the surface of the sheet can be generally excluded and consequently a hot air drying that is performed after coating can be excluded, so that the present invention can contribute to save energy and save an entire cost.

In addition, the generation of Volatile Organic Compound (VOC) that is generated when painting can be prevented thereby also contributing in terms of environment. In addition, the sheet may has a functional stability having a high properties including wear resistance, oil resistance, and aging resistance, and superior embossing retention characteristics after embossing.

DESCRIPTION OF DRAWINGS

The above and other objects, features and advantages of the present invention will become apparent from the following description of preferred embodiments given in conjunction with the accompanying drawings, in which.

BEST MODE

Figure 1:
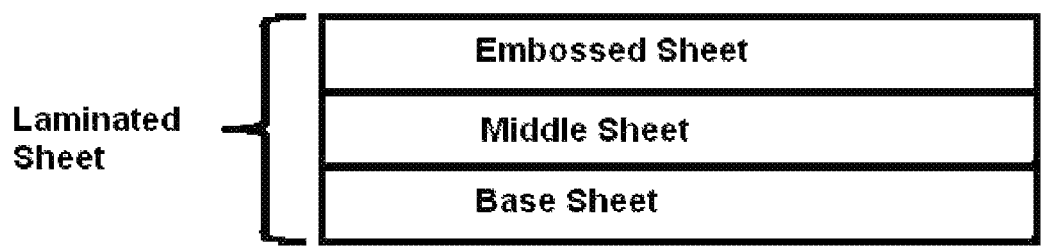
FIG. 1 is a sectional drawing showing a laminated sheet according to an embodiment of the present invention.
Figure 2:
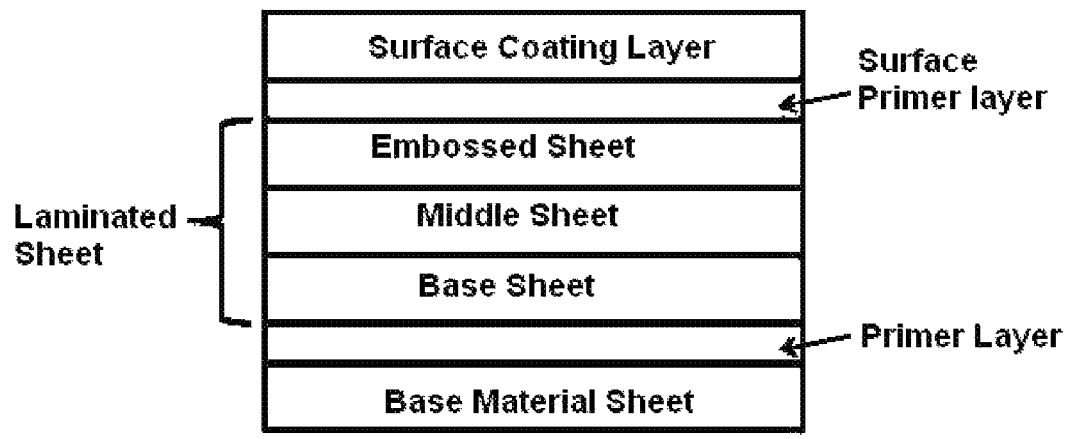
FIG. 2 is a sectional drawing showing a composite sheet according to an embodiment of the present invention.

Hereinafter, the present invention will be described in detail.

The present invention provides a sheet composition containing polystyrene-based copolymer and ethylene vinyl acetate-based copolymer, in which the content of the vinyl acetate in the ethylene vinyl acetate-based copolymer is more than 50 wt %.

At least one selected from the group consisting of SEBS (styrene-(Ethylene/Butylene) Styrene Block Copolymer), CEBC (Crystalline block-(ethylene/butylene)-crystalline block copolymer), HSBR (Hydrogenated styrene butadiene rubbers), SBS, SEBC (Stylene-(ethylene/butylene)-crystalline block copolymer), SEEPS (Polystyrene-block-poly(ethylene-ethylene/propylene)-block polystyrene), SEEPS-OH (Polystyrene-block-poly(ethylene-ethylene/propylene)-block-hydroxyl-polystyrene, SEP (Polystyrene-block-poly (ethylene/propylene) and SEPS (Polystyrene-block-poly (ethylene/propylene)-block-polystyrene) can be used as the polystyrene-based copolymer, and the specific examples include Septon (Kuraray, Japan), Tuftec (Asahi Kasei, Japan), Dynaron (JSR: Japan Special Rubber, Japan), Rabalon (Mitsubishi Chemical, Japan), S.O.E. (Asahi Kasei, Japan), Kraton G (Kraton, U.S.A.), and the like, but is not limited thereto.

The weight average molecular weight (Mw) of the polystyrene-based copolymer is preferably 50,000~300,000. When the molecular weight of the polystyrene-based copolymer is less than 50,000, formability may be lack; and when the molecular weight of the polystyrene-based copolymer exceeds 300,000, a melt viscosity may be increased thereby decreasing processability.

The content of the vinyl acetate in the ethylene vinyl acetate-based copolymer is more than 50 wt %, and more preferably more than 50 wt % to less than 70 wt %. The specific example of the ethylene vinyl acetate-based copolymer includes Levapren (EVM) (Lanxess, Germany), and the like, but is not limited thereto.

The weight average molecular weight (Mw) of the ethylene vinyl acetate-based copolymer is preferably 100,000 to 400,000.

The ethylene vinyl acetate-based copolymer may further include a comonomer on the range without detriment to the purposes according to the present invention.

When the sheet composition contains polystyrene-based copolymer and ethylene vinyl acetate-based copolymer at the same time, both of the above components are preferably contained in 1:9 to 9:1 as their weight ratio, and more preferably 8:2 to 5:5.

The sheet composition may further include at least one selected from the group consisting of flame retardant, photostabilizer, UV-absorbent, antioxidant, and crosslinking agent.

The flame retardant has a role in giving flame retardancy on the sheet, and more than one selected from the group consisting of magnesium dihydride (MDH), aluminum dihydride (ADH), antimony trioxide, and phospite can be used as the specific example.

3 to 100 parts by weight of the flame retardant is preferably contained based on 100 parts by weight of the sheet composition.

The photostabilizer has a role in preventing the delamination of the sheet, the colorization of the sheet, and the like when irritating with the light of the sun, and more than one selected from the group consisting of hindered amine-based compound (HALS) and hindered benzoate-based compound can be used as the specific example.

0.1 to 5 parts by weight of the photostabilizer is preferably contained based on 100 parts by weight of the sheet composition.

The UV-absorbent has a role in absorbing UV having a high energy for preventing, and more than one selected from the group consisting of benzophenones-based compound and benzotriazoles-based compound can be used as the specific example.

0.1 to 5 parts by weight of the UV-absorbent is preferably contained based on 100 parts by weight of the sheet composition.

The antioxidant has a role in giving the processability and the high temperature stability to the sheet composition, and more than one selected from the group consisting of phenol-based compound, phosphite-based compound, thioether-based compound and lacton-based compound can be used as the specific example.

0.1 to 10 parts by weight of the antioxidant is preferably contained based on 100 parts by weight.

More than one selected from the group consisting of trimethylolpropanetriacrylate, triethylolpropanetriacrylate, triallylisocyanurate, ethyleneglycolmethacrylate, diethyleneglycoldimethacrylate and polyethylenechlorodimethacryate can be used as the crosslinking agent.

0.1 to 10 parts by weight of the crosslinking agent is preferably contained based on 100 parts by weight.

In addition, the sheet composition according to the present invention may further include a pigment for implementing a color and/or lubricants for improving the processability and preventing a processing adhesion.

In addition, the present invention provides a sheet produced from the sheet composition.

The sheet can be produced by 1) preparing the sheet composition in a gel state through heating and pressing and 2) roll pressing and drawing the sheet composition in a gel state.

The thickness of the sheet resulted from the above steps is preferably 0.3 to 2 mm.

The sheet produced from the above steps may have a high functional stability, such as wear resistance, oil resistance, aging resistance, and the like, and also superior embossing retention characteristics.

In addition, the present invention provides a sheet that is embossed.

The embossed sheet can be produced by 1) heating the resulted sheet, 2) embossing the surface of the heated sheet, and 3) electron irradiating after cooling the embossed sheet.

For step 1) for heating the resulted sheet, the temperature of the heated sheet is preferably 150° C. to 250° C.

The step 2) is for embossing the surface of the heated sheet. That is, the surface of the sheet can be embossed by putting pressure on back-up roll of material, such as EPDM (ethylene propylene diene monomer), NBR (Nitile Butadiene Rubber), silicone, or steel, and emboss roll that is intagliated with Emboss patterns.

The sheet, in which the surface of the sheet has embosses, preferably has 0.7 to 1.3 $g/cm^3$ density.

After embossing as mentioned above, the sheet, in which the surface of the sheet has embosses, has a high temperature for a certain period, so that the modification of embosses can be performed. Therefore, the heat of the embossed sheet may preferably be cooled by using the method, such as contacting the cooling roll that is passed through a cooling water or freezing water having a low temperature, and the like.

Hereinafter, the embossed sheet may be given with crosslinking ability through an electron crosslinking. For the electron crosslinking, the irradiation strength of the electron ray is preferably 10 to 200 kGrey, and more preferably 20 to 150 kGrey.

The embossed sheet produced from the above steps may further include the surface coating layer for controlling the gloss of the embossed sheet.

In addition, the present invention provides a laminated sheet and a method for producing the same, in which a base sheet, a middle sheet, and the sheet produced from the sheet composition are laminated in serial order, and the sheet produced from the sheet composition is embossed. The embossing may be performed on the surface of the sheet before or after laminating.

The method for producing the laminated sheet may include:

1) preparing a base sheet, a middle sheet and the sheet produced from the sheet composition according to the present invention;
2) producing the laminated sheet by heating the base sheet, the middle sheet and the sheet produced from the sheet composition according to the present invention and then by laminating the above sheets in serial order;

3) heating the laminated sheet;
4) embossing the surface of the heated laminated sheet; and
5) electron irradiating after cooling the embossed sheet.

The step 1) is for preparing the base sheet, the middle sheet and the sheet produced from the sheet composition according to the present invention and the sheet according to the present invention is as mentioned above.

The base sheet has a role in showing the inherent property of the sheet while locating at the lowest side among the laminated sheet. Specifically, a primer layer and an adhesive additional layer can be coated on the bottom side of the base sheet, and since then have a role in being possible for an adhesion to the base layer. In addition, the base sheet has a role in forming operation smoothly when forming by implementing the required properties for the laminated sheet.

The middle sheet is located between the base sheet and the sheet produced from the sheet composition according to the present invention in the laminated sheet so that it has a role in bonding between them. In addition, the middle sheet has a role in forming operation smoothly when forming by implementing the required properties for the sheet.

The base sheet and the middle sheet can be produced from the resin composition containing the thermoplastic resin, and also can be produced by mixing the above composition with at least one of the polystyrene-based copolymer and the ethylene vinyl acetate-based copolymer.

TPE (Thermo polyolefin elastomer) resin crosslinked with peroxide can be used as the thermoplastic resin. The specific example may include Milastomer (Mitsui Chemical), Keyflex (LG Chem.), Plastomer (HyunDai EP), Esoflex (Sumitomo Chemical), Thermorun (Mitsubishi Chem.), Lottomer (Honam Petrochemical Corp.) and the like, but is not limited thereto.

When using the mixture of the thermoplastic resin, and at least one of the polystyrene-based copolymer and the ethylene vinyl acetate-based copolymer, the weight ratio of those components is preferably contained in 1:9 to 9:1, and more preferably 5:5 to 8:2.

In addition, the resin composition for producing the base sheet and the middle sheet may include the additives added in the sheet composition according to the present invention as mentioned above.

The base sheet and the middle sheet can be produced by using the same method as the method for producing the sheet according to the present invention, except using the resin composition containing the thermoplastic resin instead of the sheet composition according to the present invention.

The thickness of the base sheet and the thickness of the middle sheet are preferably 0.15 to 0.5 mm, respectively.

The step 2) may be performed as follows: putting the base sheet, the middle sheet, and the sheet that are prepared from the step 1) on the location support, respectively; heating the above sheets through passing the drum that is heated with steam, high-temperature oil, an electric heater; and then laminating through pressing with a press roll after gathering the preheated each sheet in serial order.

The preheating is preferably performed at 50 to 200° C.

The step 3) is for heating the laminated sheet, and the temperature of the heated sheet is preferably 150 to 250° C.

The step 4) is for embossing the surface of the heated laminated sheet. That is, the surface of the sheet can be embossed by putting pressure on back-up roll of material, such as EPDM (ethylene propylene diene monomer), NBR (Nitile Butadiene Rubber), silicone, or steel, and emboss roll that is intagliated with Emboss patterns.

The sheet, in which the surface of the sheet has embosses, preferably has 0.7 to 1.3 g/cm$^3$ density.

After embossing as mentioned above, the laminated sheet, in which the surface of the sheet has embosses, has a high temperature for a certain period, so that the modification of embosses can be performed. Therefore, the heat of the embossed sheet may preferably be cooled by using the method, such as contacting the cooling roll that is passed through a cooling water or freezing water having a low temperature, and the like.

Hereinafter, the embossed sheet may be given with crosslinking ability through an electron crosslinking. For the electron crosslinking, the irradiation strength of the electron ray is preferably 10 to 200 kGrey, and more preferably 20 to 150 kGrey.

In addition, the laminated sheet may be produced by using the method comprising:

1) preparing a base sheet, a middle sheet and the embossed sheet according to the present invention; and
2) producing the laminated sheet by heating the base sheet, the middle sheet and the embossed sheet according to the present invention, and then by laminating the above sheets in serial order.

The surface coating layer may be further included on the uppermost layer of the laminated sheet produced from the above steps in order to control the gloss of the laminated sheet.

The laminated sheet produced from the above steps may be stored by winding in Winder.

In addition, the present invention provides a composite sheet that is produced by laminating the base material layer, the primer layer, the laminated sheet, the surface primer layer, and the surface coating layer in serial order.

The base material layer is preferably produced from polyethylene, polypropylene, TPO (Thermoplastic Polyolefin), and the like, but is not limited thereto. The base material layer preferably has 1 to 5 mm of thickness, and preferably 35 to 80 g/cm$^3$ of density.

The laminated sheet is as mentioned above.

The surface coating layer has a role in enhancing the entire properties that are satisfied for requirements on the surface of the sheet, such as wear resistance, scratch resistance, and the like of the surface of the composite sheet, and the material for the surface coating layer is not specifically limited, but is preferably the coating layer containing polyurethane.

The thickness of the surface coating layer is preferably 5 to 30 μm.

The primer layer and the surface primer layer are used for giving the adhesive between the base material and the laminate sheet and between the laminated sheet and the surface coating layer. The material for producing the primer layer and the surface primer layer are not specifically limited, but may be produced from CPP (chlorinated polypropylene), CPO (chlorinated polyolefin), and PU (polyurethane) resin.

The thickness of the primer layer and the surface primer layer are preferably 5 to 30 μm.

The structure of the composite sheet according to an embodiment of the present invention is shown in Table 2.

The composite sheet according to the present invention may be used in artificial leather, foaming foam, packing materials and interior materials in a car, but is not limited thereto.

EXAMPLE

Hereinafter, the embodiments of the present invention will be described in detail. However, the following Examples are only illustrated by example, and will not be limited to the range of the present invention.

Preparation of Single Sheet

Examples 1 and 2 and Comparative Examples 1 and 2

The sheet having 0.40 mm of thickness was prepared by calendaring through using the polystyrene-based copolymer and the ethylene vinyl acetate-based copolymer as indicated in the following Table 1, respectively. ROLL temperature was adjusted as the data indicated in the following Table 2.

TABLE 1

Component Ratio of Raw Materials (wt %)

| Raw Material | Example 1 | Example 2 | Com. Example 1 | Com. Example 2 |
|---|---|---|---|---|
| Polystyrene Copolymer 1 (SEBS) | 25 | 35 | | |
| Polystyrene Copolymer 2 (SEEPS) | 50 | 40 | | |
| EVA (Ethylene Vinyl Acetate) (Content of Vinyl Acteate: 60%) | 15 | 15 | | |
| TPV (Thermmo-Plastic Elastomer Vulcanized) | | | 80 | 85 |
| LDPE (Low density Polyethylene) | | | 10 | 10 |
| Random Co Polymer PP | | | 10 | 5 |
| Lubricant | 8 | 8 | 3 | 3 |
| Antioxidant | 0.1 | 0.1 | 0.1 | 0.1 |
| HALS:Hindered Amine | 0.3 | 0.3 | 0.3 | 0.3 |
| Benzotriazoles | 0.2 | 0.2 | 0.2 | 0.2 |
| Antimony Trioxide ($SB_2O_3$) | 3 | 3 | 0 | 0 |
| pigment | 1.5 | 1.5 | 1.5 | 1.5 |

Specifically, the materials used for Examples are as follows:

| Detailed Exaplanatien about Paw Materials | |
|---|---|
| Materials | Manufacturer and Grade Name |
| SEBS (Polystyrene Copolymer) | Kuraray (ﾊﾞ) SEPTON Grade |
| SEEPS (Polystyrene Copolymer) | Kuraray (ﾊﾞ) SEPTON Grade |
| EVA (Ethylene Vinyl Acteate) Actetate 60% | Lanxess (ﾊﾞ) Levapren Grade |
| TPV (Thermmoplastic Elastomer Vulcanized) | LG Chem ﾊﾞ Keyflex Grade |
| LDPE (Low density Polyethylene) | IICC ﾊﾞ 3120 Grade |
| Random Co Polymer PP | (Japan) Primer polymer ﾊﾞ |

TABLE 2

Temperatures of Calendar roll and Take off ROLL where processing Sheet (° C.)

| ROLL #1 | ROLL #2 | ROLL #3 | ROLL #4 | Take off |
|---|---|---|---|---|
| 210 | 220 | 220 | 210 | 150 |

Preparation of Laminated Sheet

Examples 3 to 6 and Comparative Example 3

The base sheet and the middle sheet for producing the laminated sheet were prepared by calendaring from the components A and B of the thermoplastic resin composition. The middle sheet was produced in 0.5 mm of thickness and the base sheet was produced in 0.3 mm of thickness.

TABLE 3

Component Ratio of Raw Materials (wt %)

| Materials | Component A | Component B |
|---|---|---|
| Polystyrene Copolymer 1 (SEBS) | 25 | 20 |
| EVA (Ethylene Vinyl Acetate) (Content of Vinyl Acetate: 60%) | 10 | 20 |
| Crosslinked TPE (Thermo polyolefin elastomer) | 60 | 55 |
| Lubricant | 3 | 3 |
| antioxidant | 0.1 | 0.1 |
| HALS: Hindered Amine | 0.3 | 0.3 |
| Benzotriazoles | 0.2 | 0.2 |
| pigment | 1.5 | 1.5 |

The laminated sheets were produced by using the sheets as indicated in the following Table 4. Since then, the surfaces of the laminated sheets according to Examples 3 to 6, and Comparative Example 3 were embossed. Additionally, the laminated sheets according to Example 3 to 6 were electron-irradiated.

TABLE 4

| | Example 3 | Example 4 | Example 5 | Example 6 | Com. Example 3 |
|---|---|---|---|---|---|
| Sheet for Embossing | Sheet of Example 1 | Sheet of Example 1 | Sheet of Example 2 | Sheet of Example 2 | Sheet of Comparative Example 1 |
| Middle Sheet | Component A | Component B | Component A | Component B | Sheet of Comparative Example 1 |
| Base Sheet | Component A | Component B | Component A | Component B | Sheet of Comparative Example 1 |

The results for measuring the properties of the laminated sheets according to Example 3 and Comparative Example 3 were shown in the following Table 5:

TABLE 5

| | Example 3 | Com. Example 3 |
|---|---|---|
| Thickness (mm) | 1.19 | 1.20 |
| Electron irradiation Amount (KGy) | 150 | (Non Electron-Irradiated) |
| Wear Resistance | Slight change | Moderate change |
| Aging Resistance (90° C. × 1000 h) | No modification, decolorization cracking, breaking, and smaller fractures by naked eyes | No modification, decolorization cracking, breaking, and smaller fractures by naked eyes |
| Embossing Retention Force (300° C., vacuum forming after heating for 45 sec) | Embossing Pattern Retention sharpness Retention | Embossing Slack sharpness Declease |
| Oil Resistance (Parafin Oil test) | Slight Change | Moderate change |
| Flammability (mm/min) | 19 | 55 |
| Cold Resistance | No crack (−40° C.) | No crack (−40° C.) |

The invention claimed is:
1. A sheet composition for embossed sheet, comprising: polystyrene-based copolymers of 25-35% by weight of SEBS (styrene-(ethylene/butylene)-styrene block copolymer) and 40-50% by weight of SEEPS (polystyrene-block-poly(ethylene-ethylene/propylene)-block polystyrene), and ethylene vinyl acetate-based copolymer, wherein the content of the vinyl acetate in the ethylene vinyl acetate-based copolymer is more than 50 wt %, wherein the sheet composition does not include a thermoplastic resin other than the polystyrene-based copolymers and the ethylene vinyl acetate-based copolymer, and wherein a ratio of the polystyrene-based copolymers to the ethylene vinyl acetate-based copolymer is 5:1 to 5:4.

2. The sheet composition for embossed sheet of claim 1, wherein the weight average molecular weight of the polystyrene-based copolymer is 50,000 to 300,000.

3. The sheet composition for embossed sheet of claim 1, wherein the weight average molecular weight of the ethylene vinyl acetate-based copolymer is 100,000 to 400,000.

4. The sheet composition for embossed sheet of claim 1, wherein the sheet composition further includes at least one selected from the group consisting of flame retardant, photostabilizer, UV-absorbent, antioxidant, crosslinking agent, pigment and lubricant.

5. A sheet produced from the sheet composition for embossed sheet according to claim 1.

6. An embossed sheet produced from the sheet composition for embossed sheet according to claim 1, wherein the surface of the sheet is embossed.

7. The embossed sheet of claim 6, wherein the density of the embossed sheet is 0.7 to 1.3 g/cm$^3$.

8. The embossed sheet of claim 6, wherein the embossed sheet is electron-irradiated with 10 to 200 KGray of electron ray.

9. The embossed sheet of claim 6, wherein the surface of the embossed sheet further includes a surface coating layer.

10. A method for producing an embossed sheet comprising:
1) heating the sheet produced from the sheet composition for embossed sheet according to claim 1;
2) embossing the surface of the heated sheet; and
3) electron crosslinking irradiating after cooling the embossed sheet.

11. A method for producing a laminated sheet comprising:
1) preparing a base sheet, a middle sheet and the sheet according to claim 5;
2) producing a laminated sheet by preheating the base sheet, the middle sheet and the sheet according to claim 5 and then by laminating;
3) heating the laminated sheet;
4) embossing the surface of the sheet according to claim 5 among the heated laminated sheet; and
5) electron crosslinking irradiating after cooling the embossed sheet.

12. A method for producing a laminated sheet comprising:
1) preparing a base sheet, a middle sheet and the embossed sheet according to claims 6; and
2) laminating in serial order after preheating the base sheet, the middle sheet and the embossed sheet.

13. A laminated sheet, wherein a base sheet containing a thermoplastic resin, a middle sheet, and the sheet produced from the sheet composition for embossed sheet according to claim 1 are laminated in serial order, and then the surface of the sheet produced from the sheet composition is embossed.

14. The laminated sheet of claim 13, wherein the embossing is performed on the surface of the sheet produced from the sheet composition before or after laminating.

15. The laminated sheet of claim 13, wherein the base sheet and the middle sheet are produced from the resin composition containing the thermoplastic resin.

16. The laminated sheet of claim 15, wherein the resin composition further includes at least one of polystyrene-based copolymer and ethylene vinyl acetate-based copolymer.

17. The laminated sheet of claim 13, wherein the density of the embossed sheet is 0.7 to 1.3 g/cm$^3$.

18. The laminated sheet of claim 13, wherein the laminated sheet is electron-irradiated with 10 to 200 kGray.

19. The laminated sheet of claim 13, further comprising a surface coating layer formed on the surface of the embossed sheet of the laminated sheet.

20. A composite sheet, wherein the composite sheet is laminated a base material layer, a primer layer, the laminated sheet according to claim 13, a surface primer layer, and a surface coating layer in serial order.

21. The composite sheet of claim 20, wherein the surface coating layer is composed of polyurethane.

22. The composite sheet of claim 20, wherein the primer layer and the surface primer layer are composed of CPP (chlorinated polypropylene), CPO (chlorinated polyolefin) or PU (Polyurethane) resin, respectively.

* * * * *